United States Patent
Xiao et al.

(10) Patent No.: US 11,238,270 B2
(45) Date of Patent: Feb. 1, 2022

(54) 3D FACE IDENTITY AUTHENTICATION METHOD AND APPARATUS

(71) Applicant: ORBBEC INC., Guangdong (CN)

(72) Inventors: Zhenzhong Xiao, Shenzhen (CN); Yuanhao Huang, Shenzhen (CN); Xu Chen, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 96 days.

(21) Appl. No.: 16/857,406

(22) Filed: Apr. 24, 2020

(65) Prior Publication Data
US 2020/0250403 A1 Aug. 6, 2020

Related U.S. Application Data

(63) Continuation of application No. PCT/CN2018/098441, filed on Aug. 3, 2018.

(30) Foreign Application Priority Data

Oct. 26, 2017 (CN) .......................... 201711021426.5

(51) Int. Cl.
*G06K 9/00* (2006.01)
*G06T 7/50* (2017.01)
(Continued)

(52) U.S. Cl.
CPC ..... *G06K 9/00268* (2013.01); *G06K 9/00288* (2013.01); *G06K 9/6215* (2013.01);
(Continued)

(58) Field of Classification Search
CPC ........... G06K 9/00268; G06K 9/00288; G06K 9/6215; G06K 9/00208; G06K 9/6201;
(Continued)

(56) References Cited

U.S. PATENT DOCUMENTS 7,415,152 B2 * 8/2008 Jiang ................. G06K 9/00288
345/473
8,406,484 B2 * 3/2013 Yoon ................. G06K 9/00288
382/118
(Continued)

FOREIGN PATENT DOCUMENTS

CN 104050712 A 9/2014
CN 105022994 A * 11/2015
(Continued)

OTHER PUBLICATIONS

The Effectiveness of Depth Data in Liveness Face Authentication Using 3D Sensor Cameras, Ghazel Albakari et al. MDPI, Apr. 24, 2019, pp. 1-21 (Year: 2019).*
(Continued)

*Primary Examiner* — Jayesh A Patel
(74) *Attorney, Agent, or Firm* — Sheppard Mullin Richter & Hampton LLP

(57) ABSTRACT

The present application provides an identity authentication method and an apparatus. The method may include obtaining a sequence of depth images containing a target face and a sequence of original two-dimensional (2D) images containing the target face, and performing identity authentication. The identity authentication may be conducted by: calculating a target face three-dimensional (3D) texture image according to the depth images containing the target face and the original 2D images containing the target face; projecting the target face 3D texture image to a 2D plane to obtain a target face 2D image; extracting feature information from the target face 2D image; comparing the feature information of the target face 2D image with feature information of a reference face 2D image to determine a similarity value; and in response to that the similarity value
(Continued)

201 — A sequence of depth images and infrared images are obtained

202 — A 3D texture image is calculated

203 — An infrared face image is projected

204 — Feature information of a face is extracted

205 — The feature information of the face is input exceeds a first threshold, determining that the identity authentication succeeds.

20 Claims, 4 Drawing Sheets

(51) Int. Cl.
  *G06T 7/41* (2017.01)
  *G06K 9/62* (2006.01)
  *G06T 3/00* (2006.01)
(52) U.S. Cl.
  CPC .............. *G06T 3/0037* (2013.01); *G06T 7/41* (2017.01); *G06T 7/50* (2017.01); *G06T 2207/10028* (2013.01); *G06T 2207/30201* (2013.01)
(58) Field of Classification Search
  CPC  G06T 7/50; G06T 7/41; G06T 3/0037; G06T 2207/10028; G06T 2207/30201
  See application file for complete search history.

(56) References Cited

U.S. PATENT DOCUMENTS

| | | | | |
|---|---|---|---|---|
| 8,824,749 | B2* | 9/2014 | Leyvand | G06K 9/00221 |
| | | | | 382/118 |
| 2005/0031173 | A1 | 2/2005 | Hwang | |
| 2007/0086627 | A1* | 4/2007 | Kim | G06K 9/00288 |
| | | | | 382/118 |
| 2012/0230545 | A1* | 9/2012 | Zhang | G06K 9/6253 |
| | | | | 382/103 |
| 2014/0043329 | A1* | 2/2014 | Wang | G06K 9/00201 |
| | | | | 345/420 |
| 2016/0070952 | A1* | 3/2016 | Kim | G06K 9/00208 |
| | | | | 382/118 |
| 2016/0086017 | A1* | 3/2016 | Rodriguez | G06K 9/00275 |
| | | | | 382/118 |
| 2016/0342832 | A1* | 11/2016 | Bud | H04N 7/18 |
| 2016/0379041 | A1* | 12/2016 | Rhee | G06K 9/6296 |
| | | | | 382/118 |
| 2017/0069056 | A1* | 3/2017 | Sachs | G06T 7/571 |
| 2017/0154461 | A1* | 6/2017 | Rhee | G06K 9/469 |
| 2019/0182391 | A1* | 6/2019 | Tokuchi | H04N 1/00167 |
| 2021/0104086 | A1* | 4/2021 | Wang | G06N 3/084 |

FOREIGN PATENT DOCUMENTS

| | | | |
|---|---|---|---|
| CN | 105335722 | A | 2/2016 |
| CN | 105427385 | A | 3/2016 |
| CN | 105654048 | A | 6/2016 |
| CN | 105894047 | A | 8/2016 |
| CN | 105956582 | A | 9/2016 |
| CN | 106909873 | A | 6/2017 |
| CN | 107169483 | A | 9/2017 |
| CN | 107292283 | A * | 10/2017 |
| CN | 107609383 | A | 1/2018 |
| CN | 107633165 | A | 1/2018 |
| CN | 107748869 | A | 3/2018 |
| GN | 102375970 | A | 3/2012 |
| GN | 105022994 | A | 11/2015 |
| GN | 105513221 | A | 4/2016 |
| WO | 2006/047253 | A1 | 5/2006 |
| WO | 2008/095624 | A1 | 8/2008 |
| WO | WO-2016003258 | A1 * | 1/2016 ............. G06T 15/04 |

OTHER PUBLICATIONS

A Review and Analysis of Eye-Gaze Estimation Systems, Algorithms and Performance Evaluation Methods in Consumer Platforms, Anuradha Kar et al., IEEEAccess, Sep. 6, 2017, pp. 16495-16519 (Year: 2017).*

Unobtrusive and pervasive video-based eye-gaze tracking, Stefania Cristina et al., ELSEVIER, 2018, pp. 21-40 (Year: 2018).*

PCT International Search Report and the Written Opinion dated Oct. 31, 2018, issued in related International Application No. PCT/CN2018/098441, with partial English translation (9 pages).

PCT International Search Report and the Written Opinion dated Oct. 31, 2018, issued in related International Application No. PCT/CN2018/098442, with partial English translation (9 pages).

PCT International Search Report and the Written Opinion dated Oct. 29, 2018, issued in related International Application No. PCT/CN2018/098443, with partial English translation (9 pages).

PCT International Preliminary Report on Patentability dated May 7, 2020, issued in related International Application No. PCT/CN2018/098441, with English translation (12 pages).

PCT International Preliminary Report on Patentability dated May 7, 2020, issued in related International Application No. PCT/CN2018/098442, with English translation (12 pages).

PCT International Preliminary Report on Patentability dated May 7, 2020, issued in related International Application No. PCT/CN2018/098443, with English translation (12 pages).

First Search dated Mar. 21, 2019, issued in related Chinese Application No. 201711021418.0 (1 page).

First Office Action dated Apr. 2, 2019, issued in related Chinese Application No. 201711021418.0, with English machine translation (16 pages).

Supplemental Search dated Sep. 24, 2019, issued in related Chinese Application No. 201711021418.0 (1 page).

Second Office Action dated Oct. 9, 2019, issued in related Chinese Application No. 201711021418.0, with English machine translation (20 pages).

Supplemental Search dated Apr. 20, 2020, issued in related Chinese Application No. 201711021418.0 (2 pages).

Third Office Action dated Apr. 27, 2020, issued in related Chinese Application No. 201711021418.0, with English machine translation (22 pages).

Fourth Office Action dated Nov. 3, 2020, issued in related Chinese Application No. 201711021418.0, with English machine translation (28 pages).

First Search dated Mar. 21, 2019, issued in related Chinese Application No. 201711021419.5 (1 page).

First Office Action dated Apr. 2, 2019, issued in related Chinese Application No. 201711021419.5, with English machine translation (17 pages).

Supplemental Search dated Sep. 25, 2019, issued in related Chinese Application No. 201711021419.5 (1 page).

Second Office Action dated Oct. 9, 2019, issued in related Chinese Application No. 201711021419.5, with English machine translation (22 pages).

Third Office Action dated Apr. 1, 2020, issued in related Chinese Application No. 201711021419.5, with English machine translation (7 pages).

Supplemental Search dated Sep. 24, 2020, issued in related Chinese Application No. 201711021419.5 (2 pages).

First Search dated Mar. 21, 2019, issued in related Chinese Application No. 201711021426.5 (1 page).

First Office Action dated Apr. 2, 2019, issued in related Chinese Application No. 201711021426.5, with English machine translation (14 pages).

Second Office Action dated Oct. 9, 2019, issued in related Chinese Application No. 201711021426.5, with English machine translation (17 pages).

Third Office Action dated Jan. 4, 2020, issued in related Chinese Application No. 201711021426.5, with English machine translation (7 pages).

Supplemental Search dated Sep. 24, 2020, issued in related Chinese Application No. 201711021426.5 (2 pages).

* cited by examiner

3D FACE IDENTITY AUTHENTICATION METHOD AND APPARATUS

CROSS-REFERENCE TO RELATED APPLICATION

[01] This application is a continuation of International Patent Application No. PCT/CN2018/098441, filed on Aug. 3, 2018, and entitled "3D FACE IDENTITY AUTHENTICATION METHOD AND APPARATUS", which is based on and claims priority to and benefit of Chinese Patent Application No. 201711021426.5, filed with China National Intellectual Property Administration (CNIPA) of People's Republic of China on Oct. 26, 2017. The entire disclosures of all of the above-identified applications are incorporated herein by reference.

TECHNICAL FIELD

The present application relates to the field of computer technologies, and more specifically, relates to a 3D face identity authentication method and an apparatus.

BACKGROUND

A human body has various unique features such as the face, the fingerprint, the iris, and the ear. The features may be referred to as biological features. Biometric authentication is widely used in a large quantity of fields such as security, home, and intelligent hardware. Currently, more mature biometric authentication, such as fingerprint recognition and iris recognition, has been commonly applied to terminal devices, including mobile phones and computers. For those features, although related researches are already very thorough, recognition of those features, such as the face, is still not popular. A main reason is that, due to limitations in an existing recognition method, a recognition rate and stability of recognition are relatively low. The limitations mainly include impacts of the brightness and the illumination direction of ambient light, so that the recognition rate may be affected by a facial expression, and it is easy to be deceived by an artificial feature.

Existing methods of face recognition, mainly depend on a face two-dimensional color image, and when brightness of ambient light is relatively weak, a recognition effect may be seriously affected. In addition, different illumination directions may cast shadows on a face image, and the recognition effect may also be affected. When a captured referenced face image is a poker face, but a current face image is captured as a smiling face, an effect of the facial recognition may also decline. In addition, if the to-be-identified object is not a real face but a two-dimensional face picture, usually the authentication may still succeed.

For the foregoing problems, currently, biometric authentications based on near-infrared or thermal infrared images are widely adopted. The near-infrared images may not be interfered by ambient light, and can improve the stability of recognition. However, it is difficult to resolve the problem of being deceived by a man-made feature. The thermal infrared image is only imaged for a real face, and therefore, can resolve the problem of being deceived by man-made features. However, the resolution of the thermal infrared image is low, and a recognition effect is seriously affected.

Based on the foregoing descriptions, currently, there is still a lack of a comprehensive biometric authentication solution, to execute tasks such as unlocking and payment.

SUMMARY

To resolve the problem of a lack of a comprehensive facial recognition solution, the present application provides an execution method based on facial recognition.

To resolve the foregoing problems, the technical solutions used in the present application are described as follows.

At a first aspect, the present application provides an identity authentication method and an apparatus. The method may include obtaining a sequence of depth images containing a target face and a sequence of original two-dimensional (2D) images containing the target face, and performing identity authentication. The identity authentication may be conducted by: calculating a target face three-dimensional (3D) texture image according to the depth images containing the target face and the original 2D images containing the target face; projecting the target face 3D texture image to a 2D plane to obtain a target face 2D image; extracting feature information from the target face 2D image; comparing the feature information of the target face 2D image with feature information of a reference face 2D image to determine a similarity value; and in response to that the similarity value exceeds a first threshold, determining that the identity authentication succeeds.

In an embodiment, the method may further include: detecting an eye-gaze of the target face using the depth images containing the target face and/or the original 2D images containing the target face; determining whether a direction of the eye-gaze is consistent with a preset direction; and in response to that the direction of the eye-gaze is consistent with the preset direction, proceeding to perform one of the steps of the identity authentication.

In an embodiment, the method may further include: determining whether the target face is a real face using the depth images containing the target face and/or the original 2D images containing the target face; and in response to determining that the target face is a real face, proceeding to perform one of the steps of the identity authentication.

In an embodiment, the method may further include: in response to that the similarity value exceeds a second threshold, updating the feature information of the reference face 2D image with the feature information of the target face 2D image.

In an embodiment, the feature information in the reference face 2D image may be obtained by: obtaining a sequence of depth images containing a reference face and a sequence of original 2D images containing the reference face; calculating a reference face 3D texture image according to the depth images containing the reference face and the original 2D images containing the reference face; projecting the reference face 3D texture image to a 2D plane to obtain the reference face 2D image; and extracting the feature information of the reference face 2D image from the reference face 2D image.

In an embodiment, the target face 3D texture image may comprise a 3D point cloud with texture information or a 3D mesh with texture information, and projecting the target face 3D texture image to a 2D plane to obtain the target face 2D image comprises projecting the 3D point cloud or the 3D mesh onto a 2D plane to form the target face 2D image.

In an embodiment, the target face original 2D images may comprise an infrared image or a structured light image.

At a second aspect, the present application provides an identity authentication method and an apparatus. The identity authentication method may comprise: obtaining a depth image containing a target face and an original 2D image containing the target face; and performing identity authentication. The identity authentication may be performed by: obtaining posture information of the target face by registering the depth image containing the target face with a reference face 3D texture image; projecting the reference face 3D texture image to a 2D plane to obtain a reference face 2D image according to the posture information of the target face; comparing the original 2D image containing the target face with the reference face 2D image to determine a similarity value; and in response to that the similarity value exceeds a first threshold, determining that the identity authentication succeeds.

At a third aspect, the present application provides an identity authentication method and an apparatus. The identity authentication method may comprise: obtaining a depth image containing a target face and an original 2D image containing the target face; and performing identity authentication. The identity authentication may be performed by: obtaining posture information of the target face by registering the depth image containing the target face with a reference face 3D texture image; obtaining a target face 2D image by aligning the original 2D image containing the target face with the posture information of the target face; extracting feature information from the target face 2D image; comparing the feature information of the target face 2D image with feature information of a reference face 2D image to determine a similarity value; and in response to that the similarity value exceeds a first threshold, determining that the identity authentication succeeds.

At a fourth aspect, the present application may further provide a 3D face identity authentication apparatus. The apparatus may include: a depth camera, configured to obtain a sequence of target face depth images containing a target face; a 2D camera, configured to obtain a sequence of target face original 2D images containing the target face; and a processor, configured to receive the target face depth images and the target face original 2D images, and perform the following operations: calculating a target face 3D texture image according to the target face depth images and the target face original 2D images; projecting the target face 3D texture image to a 2D plane to obtain a target face 2D image; extracting feature information from the target face 2D image; comparing the feature information of the target face 2D image with feature information of a reference face 2D image to determine a similarity value; and in response to that the similarity value exceeds a first threshold, determining that the identity authentication succeeds.

At a fifth aspect, the present application may further provide an identity authentication apparatus. The apparatus may include: a depth camera, configured to obtain a target face depth image containing a target face; a 2D camera, configured to obtain an original target face 2D image containing the target face; and a processor, configured to receive the target face depth image and the original target face 2D image, and perform the following operations: obtaining target face posture information by registering the target face depth image with a reference face 3D texture image; projecting the reference face 3D texture image to a 2D plane to obtain a reference face 2D image according to the target face posture information; comparing the original target face 2D image with the reference face 2D image to obtain a similarity value; and in response to that the similarity value exceeds a first threshold, determining that the identity authentication succeeds.

At a fifth aspect, the present application may further provide an identity authentication apparatus. The apparatus may include: a depth camera, configured to obtain a target face depth image containing a target face; a 2D camera, configured to obtain a target face original 2D image containing the target face; and a processor, configured to receive the target face depth image and the target face original 2D image, and perform the following operations: obtaining target face posture information by registering the target face depth image with a reference face 3D texture image; obtaining a target face 2D image by aligning the target face original 2D image with the target face posture information; extracting feature information from the target face 2D image; comparing the feature information of the target face 2D image with feature information of a reference face 2D image to determine a similarity value; and in response to that the similarity value exceeds a first threshold, determining that the identity authentication succeeds.

DETAILED DESCRIPTION OF THE EMBODIMENTS

Figure 1:
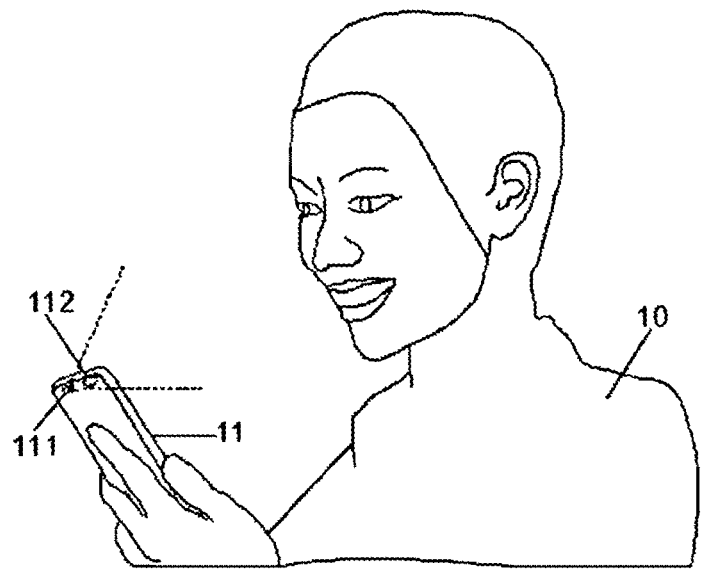
FIG. 1 is a schematic diagram of a 3D face identity authentication scenario, according to an embodiment of the present application.

To clearly and comprehensively describe the to-be-resolved technical problems, technical solutions, and beneficial effects of the embodiments of the present application, the present application is described in detail with reference to the accompanying drawings and embodiments hereinafter. It should be understood that the specific embodiments described herein are merely used for explaining the present application, but do not limit the present application.

It should be noted that, when an element is described as being "secured on" or "disposed on" another element, the element may be directly on the another element or indirectly on the another element. When an element is described as being "connected to" another element, the element may be directly connected to the another element or indirectly connected to the another element. In addition, the connection may function as securing, or may function as circuit communication.

It should be understood that, a direction or location relationship indicated by a term, such as "length," "width," "above," "under," "front," "rear," "left," "right," "vertical," "horizontal," "top," "bottom," "inner," or "outer," is a direction or a location relationship shown based on the accompanying drawings, to conveniently describe the embodiments of the present application and to simplify the description, but does not indicate or imply that a mentioned apparatus or element needs to have a particular direction and is constructed and operated in the particular direction. Therefore, the direction or location relationship shall not be understood as a limitation on the present application.

In addition, terms "first" and "second" are only used to describe the objective and shall not be understood as indicating or implying relative importance or implying a quantity of the indicated technical features. Thus, a feature defined to be "first" or "second" may explicitly or implicitly include one or more features. In the descriptions of the embodiments of the present application, "a plurality of" means two or more, unless otherwise definitely and specifically defined.

The face identity authentication technology may be used in fields such as security and monitoring. Currently, with popularity of smart terminal devices (such as mobile phones and tablets), a face identity may be applied to unlocking and payment, even entertain games, and so on. Most smart terminal devices, like mobile phones, tablets, computers, and televisions, are mostly equipped with a color camera. After using the color camera to capture an image including a face, the image is used for facial detection and recognition, so as to further use the recognition results to execute other related applications. However, for a mobile terminal device such as the mobile phone and the tablet, the environment usually changes, which may well affect imaging of the color camera. For example, when light is weak, a face cannot be well imaged. On the other hand, the color camera cannot recognize whether a to-be-recognized object is a real face.

The present application provides a three-dimensional (3D) face identity authentication method and an apparatus. Depth images and two-dimensional (2D) images that are insensitive to ambient light are used to implement functions of inputting, detecting, and recognizing a face identity, and combined with liveness verification based on the depth images and the 2D images to avoid false recognition of an identity of a false face. The 2D images herein may be an infrared image, an ultraviolet image, or the like. A corresponding capturing camera may be a plane camera such as an infrared camera, an ultraviolet camera, or the like. In the following descriptions, the infrared image is used as an example for description.

FIG. 1 is a schematic diagram of a 3D face identity authentication scenario according to an embodiment of the present application. A user 10 holds a face identity authentication apparatus 11 (e.g., a mobile terminal, such as a mobile phone or a tablet), and a depth camera 111 and an infrared camera 112 are disposed inside the apparatus 11. When the apparatus 11 faces toward a face, the depth camera 111 is used to capture a depth image including a target face, and the infrared camera 112 is used to capture an infrared image including the target face. Before performing face identity authentication, information of a reference face needs to be input into the apparatus 11 to facilitate subsequent comparison and authentication. During the face identity authentication stage, the apparatus 11 may capture a depth image and an infrared image of a current target face, and extract feature information of the current target face based on the depth image and the infrared image. When the feature information matches the feature information of the reference face, the face identity authentication succeeds, otherwise it fails. The "reference face" and "target face" described above are merely used for distinguishing two different stages, a face identity input stage and a face identity authentication stage. Abstractly, the essence of the face identity authentication is to verify whether the target face and the reference face are the same.

3D Face Identity Input and Authentication

Figure 2:
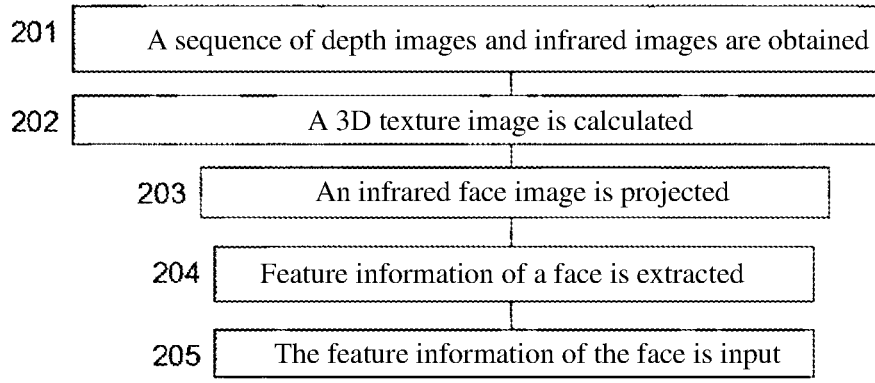
FIG. 2 is a flowchart of a 3D face identity input method, according to an embodiment of the present application.

FIG. 2 is a flowchart of a 3D face identity input method, according to an embodiment of the present application. The method includes the following steps.

In Step 201, a sequence of depth images and infrared images are obtained.

In this step, a sequence of depth images containing a reference face and a sequence of infrared images containing the reference face are respectively captured by using the depth camera 111 and the infrared camera 112. The reason why a sequence of images are captured is that a single image cannot include information of the entire face. Therefore, the sequence of images including information of all parts of the face need to be captured. The depth images and the infrared images may be captured synchronously or captured at different time. During capturing images, one manner is that the apparatus 11 does not move, and the face changes directions continuously for capturing the sequence of images including information of all parts of the face. Another manner is that the face does not move, and the apparatus 11 moves to capture the sequence of images including information of all parts of the face. It may be understood that any other capturing manner can be applied to the present application.

When the sequence of depth images and the sequence of infrared images that include the reference face are captured, preferably, the face areas included in any one of the images and at least another one of the images at least partially overlap, and the overlapped parts in the images are beneficial to subsequent image fusion. For example, three images are respectively captured on the left, middle, and the right side of the face, and the image in the middle shares some common face areas with the images on the left and right sides.

Usually, the captured depth images or infrared images include both a face and a background. Therefore, in this step, a splitting step may be further performed for detecting the face. For example, for the depth image, the face may be split according to the depth information, and for the infrared image, a method based on contour recognition or a detection method based on machine learning, such as an Adaboost algorithm, or based on a neural network may be used. It may be understood that any proper face detection method may be applied to the present application.

In this embodiment, the depth image and the infrared image have been registered (referring to the following descriptions for details). Therefore, when face detection is performed, only one type of image needs to be detected, and the face in the other type of image may be directly obtained according to a correspondence. For example, the face detection is performed on the infrared image using a trained neural network model, so as to obtain a new infrared image in which a part or all of the background is removed by splitting. Subsequently, a new depth image may be obtained according to the correspondence between the depth image and the infrared image. In an embodiment, a detection method in which the two images are more efficiently combined is adopted. First, according to the depth value of a corresponding pixel in the depth image and the depth value and lens parameters of the infrared camera, a size of a face area at the depth value may be estimated. Then, an infrared image area in the infrared image corresponding to the size of the face area at the depth value and having the pixel as a center is selected as an object for performing the face detection. In a conventional method, when face detection is performed on the infrared image, the size of the face area can only reach a best effect through a specific quantity of iterations. However, in this method, the size is directly determined via the depth information, thereby accelerating the face detection.

In Step 202, a 3D texture image of a face is calculated.

In this step, a sequence of the face depth images obtained in the previous step are first fused into a 3D point cloud model of the entire face. In an embodiment, a sequence of the depth images are fused into a 3D image, such as a 3D point cloud model of the face, by using an iterative closest point (ICP) algorithm based on the overlapped face parts in different depth images in sequence. The Kinectfusion method recited in the thesis "Kinectfusion Real-time 3D reconstruction and interaction using a moving depth camera" may be applied to the present application. In some embodiments, in consideration of that the expression of the face may change in the process of capturing a sequence of the images, a dynamic fusion algorithm may be used to obtain the 3D point cloud model of a face. For example, the Dynamicfusion algorithm in the thesis "Dynamicfusion reconstruction and tracking of non-rigid scenes in real-time" may be applied to the present application. In some embodiment, considering that 3D point cloud model is noisy and the amount of data is large, it is necessary to convert the 3D point cloud model into a 3D mesh model. Any proper mesh generation algorithm may be applied to the present application. In the following descriptions, the 3D point cloud model or the 3D mesh model may be expressed uniformly as a 3D image.

Subsequently, the texture information included in the infrared image is put into the 3D image, so as to obtain the 3D texture image. When the infrared image and the depth image are registered, each pixel in the depth image not only includes a pixel value indicating the depth, but also includes a pixel value indicating the texture information. Therefore, after the 3D image is obtained, pixel values indicating the texture information are granted to points (nodes) in the 3D image, so as to obtain the 3D texture image.

In Step 203, an infrared face image is projected.

In this step, a 2D infrared face image is obtained by projecting the 3D texture image onto a 2D plane. In consideration of that the below face has the maximum quantity of pieces of feature information, in an embodiment, in order to obtain a complete infrared front face image, first, a front orientation of a face is obtained according to the 3D information in the 3D texture image. Second, the 3D texture image is projected onto a 2D plane perpendicular to the front face orientation. In this way, a complete infrared front face image can be obtained. It may be understood that after the 3D texture image is obtained, a complete infrared front face image at any perspective may be obtained in a manner of projecting the 3D texture image onto a 2D plane. It should be noted that to distinguish an originally obtained infrared image from an infrared image obtained through projection or conversion, in the present application, the infrared image obtained through projection or conversion is uniformly expressed as the "infrared face image".

In Step 204, feature information of the face is extracted.

The feature information of the face may be extracted from the infrared front face image obtained in the previous step by using a feature extraction algorithm. In an embodiment, the feature information of the face may be output by putting the infrared face image into a pre-learned neural network (for example, a convolutional neural network (CNN)).

In Step 205, the feature information of the face is input.

The extracted feature information of the face may be stored in the apparatus 11 as identity authentication features of a reference face for subsequent identity authentication comparison of a target face.

Figure 3:
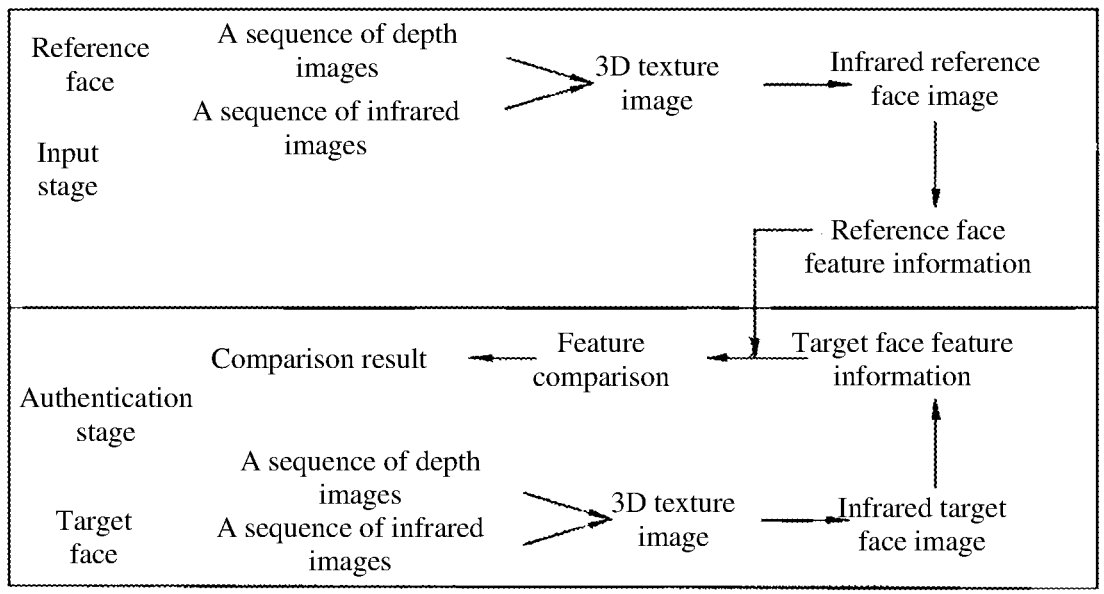
FIG. 3 is a schematic diagram of a 3D face identity input and authentication method, according to an embodiment of the present application.

It may be understood that the foregoing face identity input method may also be used for performing the face identity authentication. FIG. 3 is a schematic diagram of a 3D face identity input and authentication method, according to an embodiment of the present application. The authentication steps may include: obtaining a sequence of depth images and a sequence of original two-dimensional images that contain a target face; calculating a 3D texture image of the target face based on the depth images and original 2D images that contain the target face; projecting the 3D texture image of the target face into an infrared image of the target face; extracting feature information from the infrared image of the target face; and, unlike the input of facial features, comparing the feature information of the target face with the feature information of the reference face to determine whether the two faces are the same face. In the step of projection, it is not necessary to project the infrared image of the front face, as long as the projections are performed in a same plane (direction) during the input and authentication stages.

However, when the face authentication is performed using the foregoing method, a plurality of images of the current user need to be captured, resulting in consuming more time and relatively poor user experience. Therefore, in the present application, a face identity authentication method with a higher speed and better experience is provided.

Figure 4:
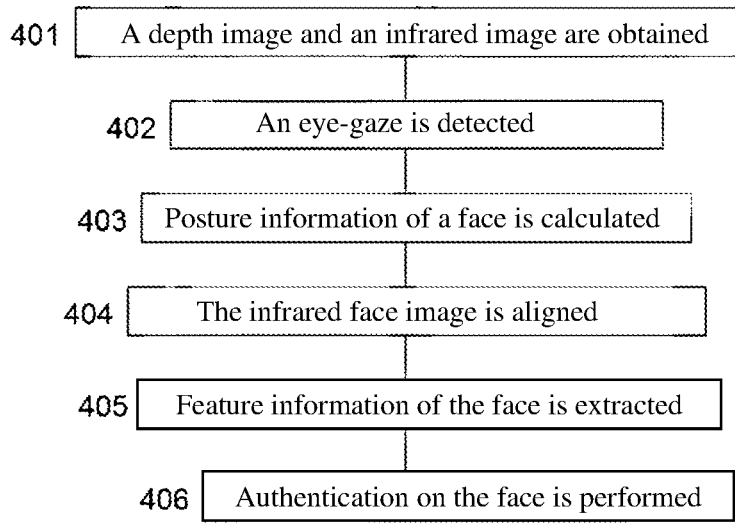
FIG. 4 is a flowchart of a 3D face identity authentication method, according to another embodiment of the present application.
Figure 5:
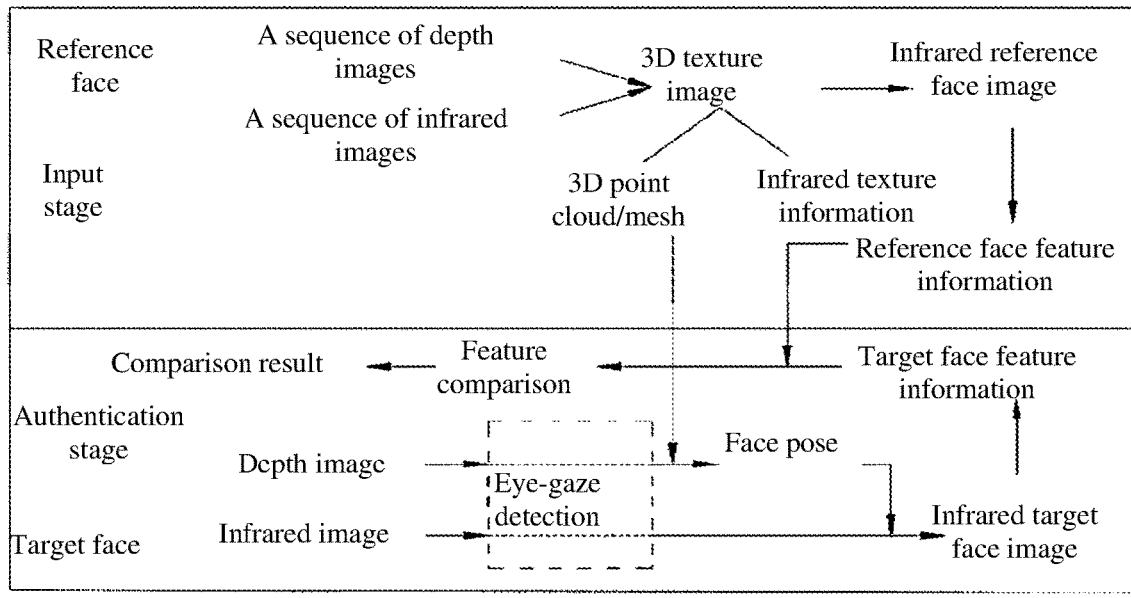
FIG. 5 is a schematic diagram of a 3D face identity input and authentication method, according to another embodiment of the present application.

FIG. 4 and FIG. 5 are schematic diagrams of a 3D face identity input and authentication method, according to an embodiment of the present application. The face identity input method corresponding to the 3D face identity authentication method shown in FIG. 4 is the same in the embodiment shown in FIG. 2. The details may refer to FIG. 5. The authentication method includes the following steps.

In Step 401, a depth image and an infrared image are obtained.

In this step, the depth camera 111 and the infrared camera 112 capture a depth image and an infrared image that include a target face. Unlike the step in the face input method, a plurality of images is not needed to be captured in a face identity authentication stage. In an embodiment, only one depth image and one infrared image need to be captured. This manner may also accelerate face identity authentication and bring better experience to the user. It may be understood that in other embodiments, a plurality of images may alternatively be captured. However, compared with the a sequence of images including all information of a face in the face input stage, there are still relatively few images. In the following descriptions, a single depth image and a single infrared image are used for description.

After the depth image and the infrared image that include a face are obtained, similar to step 201, this step usually further include a face detection and splitting step, in order to obtain a depth image and an infrared image in which a part or all of the background is removed.

In Step 402, an eye-gaze is detected.

The eye-gaze represents a location to which a current eye pays attention. Eye-gaze detection is applied to a large quantity of applications. In this embodiment, the eye-gaze detection is also performed to improve user experience. It may be understood that, alternatively, the eye-gaze detection step may not be applied to the 3D face identity authentication. In addition, step of the eye-gaze detection may alternatively be arranged between other steps in this embodiment. That is, the eye-gaze detection step is more independent than other steps, and this step may be performed according to different application requirements to obtain an eye-gaze detection result.

The eye-gaze detection may be implemented by using the depth image, the infrared face image, or a combination of both. In this embodiment, preferably, a combination of the depth image and the infrared image is adopted to detect an eye-gaze. First, 3D information (such as a 3D point cloud) of a face is calculated using the depth image, and a face orientation, 3D coordinates of a key point, may be obtained according to the 3D information. Second, detailed features of eyes, such as a center of a pupil, a flash point (a fixed speckle formed in the infrared camera by light reflected by the cornea of human after being irradiated by infrared light), pupils, and iris, are further recognized according to the infrared image. The 3D coordinates of the detailed features of the eyes may further be obtained based on the 3D information of the face and a relationship between the infrared image and the depth image (i.e., overlapping with each other, or correspondences between pixels of the two images after registration). Finally, a direction of the eye-gaze is calculated with reference to the 3D coordinates of one or more detailed features of the eyes.

Any eye-gaze detection methods known to persons of ordinary skill in the art may also be applied to the present application. For example, eye-gaze detection may be performed by merely using the infrared image.

The eye-gaze detection may further improve user experience of the face identity authentication. For example, in the embodiment shown in FIG. 1, when eyes do not focus on the apparatus 11 and the face is happened to be captured by the depth camera 111 and the infrared camera 112, the authentication performed at this time is usually not a subjective will of the user, but a kind of mis-authentication. Therefore, in some applications, the eye-gaze detection may be an independent step. In other steps, whether a subsequent step needs to be further performed or which method needs to be performed may be determined based on the eye-gaze detection result in this step.

In this embodiment, when it is detected that a direction of the eye-gaze is the same as a preset eye-gaze direction, then a next step is performed. The preset eye-gaze direction herein usually refers to an eye-gaze direction or attention of a current 3D face identity authentication application, for example, a face identity authentication application, such as unlocking and payment, displayed on a screen in the apparatus 11. In some embodiments, the preset eye-gaze direction may refer to another direction, for example, a direction pointing to the apparatus 11.

It may be understood that the step of the eye-gaze detection may also be applied to the embodiment shown in FIG. 3.

In this embodiment, because the current face is imaged only once, the single depth image or infrared image usually may include only partial facial information, and the feature is directly extracted from the single image and matched with the feature information of the reference face, resulting in a lower matching precision. Therefore, in this embodiment, posture information of the current target face is first obtained using the depth image. Then alignment and correction are performed on the infrared image of the target face based on the posture information. An objective of the correction is to obtain an infrared image of the current face having a pose which is the same as that of the reference face. In this way, recognition error of the face image caused by different poses may be eliminated to the maximum extent. The facial features are extracted from the corrected image of the target face, and authentication is performed by comparing the features of images of the target face with the features of the image of the reference face. The steps are described below in detail.

In Step 403, posture information of a face is calculated.

The 3D image (such as the 3D point cloud or the 3D mesh) of the reference face has been stored during the face input stage. In this step, the depth image of the target face obtained in step 301 is aligned with the 3D image of the reference face. In an embodiment, the alignment of the two images may be implemented using the ICP algorithm, and the posture information of the current target face relative to the reference face may be obtained after the alignment operation.

In some embodiment, a 3D image of a standard face may be adopted, and the 3D image of the standard face is used as the 3D image of the reference face for calculating the posture information of the target face.

In Step 404, the infrared face image is aligned with the posture information.

After the posture information of the current target face is obtained, alignment or correction on the infrared image of the target face is performed based on the posture information, so as to obtain an aligned or corrected infrared image of the current target face having the same pose as that of the infrared image of the reference face obtained in step 203. Preferably, the infrared image of the reference face is an image of the front face, such that an objective of the alignment is to obtain an infrared image of the current target front face. Pose-based face image alignment algorithms in the existing technologies may be applied to the present application, for example, the method recited in the thesis "DeepFace Closing the Gap to Human Level performance in face verification."

In Step 405, feature information of the face is extracted.

For the aligned infrared image of the target face obtained in the previous step, the feature information of the target face is extracted using a pose extraction algorithm. In an embodiment, the aligned infrared image of the target face is input into a neural network that is used in the input stage, and the feature information including a similar structure may be output.

In Step 406, authentication on the face is performed.

The feature information of the current target face obtained in the previous step is compared with the feature information of the reference face obtained in the input stage, so as to determine whether the two faces are the same face. The comparison herein usually outputs a similarity value, and when the similarity value exceeds a preset threshold, for example, 80%, it is considered that the two faces are the same face. Otherwise, the two faces are determined as different faces.

FIG. 5 is a schematic diagram of the foregoing described 3D face identity input and authentication method. It should be noted that in the input stage, in addition to inputting and storing the obtained feature information of the reference face, actually, the 3D image (the 3D point cloud/mesh) of the reference face also needs to be input and stored, to invoke a 3D image when the pose of the reference face is calculated in the authentication stage.

In the embodiments corresponding to FIG. 4 and FIG. 5, the precision of 3D face identity authentication greatly depends on the precision of alignment and correction of the infrared face image. Because merely a single infrared image or a few infrared images are obtained in the authentication stage, when the obtained infrared images have bias poses, for example, head-ups or side faces, although the image is converted with the same posture as the infrared image of the target face in the input stage through alignment and correction, the features lost due to the side face cannot be recovered by the alignment and correction algorithm. Based on this, the present application further provides a 3D face identity input and authentication method having a higher precision.

Figure 6:
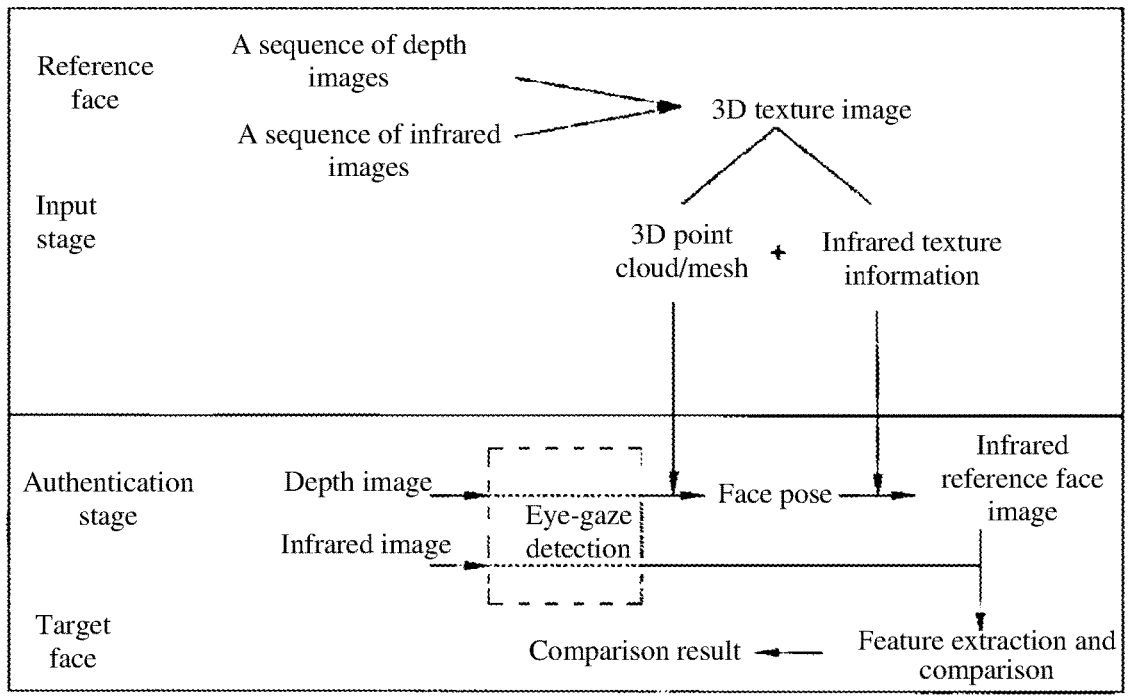
FIG. 6 is a schematic diagram of a 3D face identity input and authentication method, according to still another embodiment of the present application.

FIG. 6 is a schematic diagram of a 3D face identity input and authentication method, according to another embodiment of the present application.

In the input stage, a sequence of depth images and infrared images of a reference face are first obtained. Then, a 3D texture image including a 3D point cloud/mesh and texture information is calculated. Finally, the 3D texture image is input and stored into a memory to be deployed.

In the authentication stage, first, the depth image and the infrared image of the target face are obtained. In this step, face detection and image splitting usually further need to be performed, so as to obtain a face image. Then eye-gaze detection is performed. When the direction of the eye-gaze matches a preset direction, a next step is performed, that is, matching (alignment or registration) is performed between the depth image of the target face and the stored 3D point cloud/mesh of the reference face, so as to obtain the posture information of the target face. The projection of the 3D texture image of the reference face is performed according to the posture information, so as to obtain an infrared image of the reference face having a pose which is the same as that of the target face. Further, the infrared image of the reference face and the infrared image of the target face are put into a neural network to extract facial feature information, respectively. Finally, facial features of the reference face is compared with facial features of the target face to output a comparison result.

In this embodiment, an infrared face image of the reference face having a pose closest to the pose of the target face is obtained by obtaining the posture information of the target face and projecting the 3D texture image of the reference face according to the pose. Compared to the method shown in FIG. 4 and FIG. 5, in this method, the pose of the infrared image does not need to be changed by using the alignment and correction algorithm. Because the 3D texture image includes all information of the reference face, it may be ensured that the infrared image of the reference face obtained through projection has the highest similarity to the infrared image of the target face. This is beneficial for improving precision of authentication.

In addition, in this embodiment, since the feature extraction and comparison are performed on the infrared images of the reference face and the target face in the authentication stage, in terms of algorithm selection, a depth learning algorithm for determining a similarity may also be trained. When two images are input therein, the algorithm can output the similarity, thereby accelerating the authentication.

Liveness Verification

The face authentication methods described above, may be easy to be "deceived." For example, when a 2D image or a 3D model of one face is used as a target face, the authentication of the target face may succeed when using the foregoing methods. This is unacceptable in some applications based on the face authentication, such as unlocking and payment. To solve the problem, the 3D face identity authentication method provided in the present application may further include a step of liveness verification, and this step is used for determining whether the current target face is a real face. Only when the similarity between the target face and the reference face exceeds a preset threshold, and the target face is determined as a real face, the authentication may succeed. Otherwise, the authentication fails.

There are a large quantity of liveness verification methods. In an embodiment, whether the target is a 3D target may be determined based on the obtained depth image of the target face to resolve the "deception" caused by a 2D image. In an embodiment, a skin evaluation may be performed by extracting an implied facial skin feature in the infrared image to resolve the "deception" caused by a common 3D model. Nonetheless, there is still lack of an effective liveness verification method that can address various "deception" problems. The present application may provide an algorithm to resolve the problem.

The liveness verification method in the present application is based on the depth learning algorithm. In an embodiment, a neural network model is constructed and trained using a large volume of data. The large volume of data herein includes depth images and infrared images of a real person, 2D pictures, realistic masks, 3D models, and the like. A greater volume of data indicates a more precise neural network model. The trained neural grid may accurately find out a real face from various false faces, so as to realize the liveness verification. In an embodiment, the obtained depth image and the infrared image of the target face are input into a neural grid, and a result indicating whether the face is a real face can be output. In another embodiment, only the depth image or the infrared image is input into the neural grid, and a result indicating whether the face is a real face may be output.

Therefore, in the 3D face identity authentication process, only when the similarity between the current target face and the reference face exceeds the preset threshold and the liveness verification succeeds, the authentication may succeed. Otherwise, the authentication fails. In some embodiments, the step of the liveness verification may also be arranged after the depth image and the infrared image are obtained. The comparison of the similarity may only be performed after the liveness verification succeeds. Therefore, the liveness verification step is more independent than steps other than obtaining the depth image and the infrared image. This step may be performed before any step, and whether to continue to perform a next step is determined according to the result of liveness verification.

It may be understood that when the obtained similarity is lower than the preset threshold, the liveness verification step may be skipped. In addition, the liveness verification step may be performed together with steps such as feature extraction and comparison. That is, only when the liveness verification succeeds, the comparison of the similarity may be performed on the target face.

Data Updating

In consideration of that the face may change over time such as changes caused by growth or illness, and with time goes by, the changes may become more obvious. To deal with impacts of the changes on the precision of the 3D face identity authentication algorithm, in this embodiment, the 3D face identity authentication algorithm may further include a data updating step for dealing with the changes of a face.

In the foregoing various embodiments, when the similarity between the target face and the reference face exceeds a threshold and the liveness verification succeeds, the authentication succeeds. It may be learned that, if the input information of the reference face is always kept unchanged, when the changes of the target face increase with time goes by, the similarity may be decreased until recognition fails.

That is, the current target face cannot be distinguished as the original reference face. To address such a problem, after the 3D face authentication succeeds, when the similarity is higher than another threshold, the information of the current target face is used as new information of the reference face. Because the information of the reference face is continuously updated, even a face is greatly changed over time, authentication may be still performed on the face precisely. It should be noted that, the threshold (i.e., a second threshold) corresponding to the information updating step is usually higher than the threshold (i.e., a first threshold) in the face authentication determination step.

In some authentication methods, updating the information of the reference face described herein may refer to updating different information. For example, in the embodiment shown in FIG. 3, in addition to updating the feature information of the infrared face image, the 3D texture image of the face may also be updated. In the embodiment shown in FIG. 5, the feature information of the infrared face image is updated, that is, data updating is implemented by using the feature information of the target face as new feature information of the reference face. In the embodiment shown in FIG. 6, the 3D texture image of the face is updated, that is, texture information in the 3D texture image of the original reference face is replaced with the corresponding texture information in the 2D image of the target face.

3D Face Identity Authentication Apparatus

Figure 7:
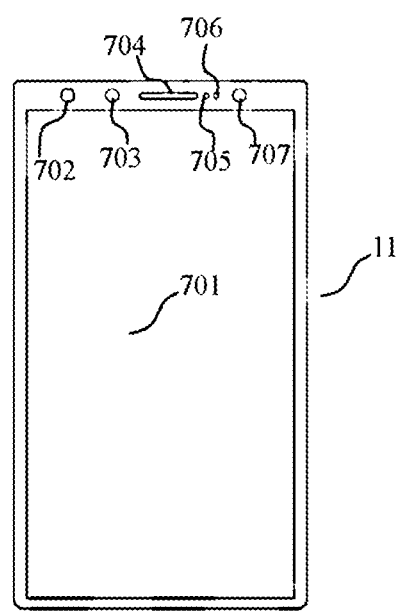
FIG. 7 is a schematic diagram of a 3D face identity authentication apparatus, according to an embodiment of the present application.

FIG. 7 is a schematic diagram of a 3D face identity authentication apparatus, according to an embodiment of the present application. An apparatus 11 includes a projection module 702 and a capturing module 707. The projection module 702 is used to project an infrared structured light image to a target space, and the capturing module 707 is used to capture the structured light image. The apparatus 11 further includes a processor (not shown in the figure), and the processor is used to calculate a depth image of the target after receiving the structured light image. In addition to structured light information, the structured light image herein further includes facial texture information. Therefore, together with the depth information, the structured light image may also participate in the face identity input and authentication as an infrared face image. In this case, the capturing module 707 may be a part of the depth camera 111 in FIG. 1 and may also be the infrared camera 112. That is, the depth camera and the infrared camera herein may be considered as a same camera.

In some embodiments, the apparatus 11 further includes an infrared floodlight 706 that can emit infrared light of the same wavelength as that of the structured light emitted by the projection module 702. During the face input and authentication, the projection module 702 and the infrared floodlight 706 may be switched on or off in a time division manner, to respectively obtain a depth image and an infrared image of the target, so that the obtained infrared image is a pure infrared image. Compared with the structured light image, the feature information of a face included in the pure infrared image is more apparent, and precision of face authentication is higher.

In some embodiments, a depth camera based on a time of flight (TOF) technology may be used. In this case, the projection module 702 may be used to transmit a light pulse, and the capturing module 707 may be used to receive the light pulse. The processor may be used to record times of pulse emission and receiving, and calculate the depth image of the target according to the times. In this embodiment, the capturing module 707 may simultaneously obtain the depth image and the infrared image of the target, and there is no visual difference between the two images.

In some embodiments, an extra infrared camera 703 may be used to obtain infrared images. When a wavelength of a light beam emitted by the infrared floodlight 706 is different from a wavelength of a light beam emitted by the projection module 702, the depth image and the infrared image of the target may be obtained using the capturing module 707 and the infrared camera 703 synchronously. A difference between such an apparatus and the apparatuses described above is that, because cameras that obtain the depth image and the infrared image are different, there may be a visual difference between the two images. If an image without a visual difference is needed in the calculation processing performed by the subsequent facial recognition, the depth image and the infrared image need to be registered in advance.

The terminal device may further include a receiver 704 and an ambient light/proximity sensor 705, so as to implement more functions. For example, in some embodiments, in consideration of that infrared light is harmful to a human body, when a face is extremely close, proximity of the face may be detected by using the proximity sensor 705. When it indicates that the face is extremely close, projection of the projection module 702 may be turned off, or projection power may be reduced. In some embodiments, the facial recognition and the receiver may be combined to make an automatic call. For example, when the apparatus is a communications apparatus, after the apparatus receives an incoming call, a facial recognition application is enabled, and the depth camera and the infrared camera are enabled to capture a depth image and an infrared image. When authentication succeeds, the call is answered, and a device, such as the receiver, is enabled to make the call.

The terminal device may further include a screen 701. The screen 701 may be used to display image content, or may be used to perform touch interaction. Functions of the apparatus, such as unlocking a screen, may be implemented by using the face authentication method. In an embodiment, when the apparatus 11 is in a state such as sleeping and a user picks up the apparatus 11, an inertia measurement unit in the apparatus 11 may light the screen when recognizes the acceleration caused by the picking up. Simultaneously, a to-be-unlocked instruction may be displayed on the screen. In this case, the apparatus enables the depth camera and the infrared camera to capture the depth image and/or the infrared image. When a face is detected in the captured image, a face authentication application is enabled. In a face authentication process, a preset eye-gaze direction of eyes may be set as a direction in which an eye-gaze is on the screen 701. Only when the eyes gaze is on the screen, unlocking may be further performed.

The apparatus 11 may further include a memory (not shown in the figure). The memory is used to store feature information input in an input stage, and may further store an application program, an instruction, and the like. For example, the above-described 3D face identity input and authentication method may be stored into the memory in a form of a software program. When an application program is needed, the processor invokes the instruction in the memory and performs the input and authentication method. It may be understood that, the 3D face identity input and authentication method may be directly written into the processor in a form of instruction code to improve the execution efficiency. In addition, with development of technologies, the boundary between software and hardware gradually disappears. Therefore, the 3D face identity input and authentication method in the present application may be used in the apparatus 11 in a form of software or hardware.

The above are detailed descriptions of the present application with reference to specific embodiments, and it should not be considered that the specific implementation of the present application is limited to the above descriptions. A person skilled in the art may further make various equivalent replacements or obvious variations without departing from the concept of the present application, with the unchanged functions and uses. Such replacements or variations should all be considered as falling within the protection scope of the present application.

What is claimed is:

1. An identity authentication method, comprising:
obtaining a sequence of depth images containing a target face and a sequence of original two-dimensional (2D) images containing the target face; and
performing identity authentication by performing steps comprising:
calculating a target face three-dimensional (3D) texture image according to the depth images containing the target face and the original 2D images containing the target face;
projecting the target face 3D texture image to a 2D plane to obtain a target face 2D image;
extracting feature information from the target face 2D image;
comparing the feature information of the target face 2D image with feature information of a reference face 2D image to determine a similarity value; and
in response to that the similarity value exceeds a first threshold, determining that the identity authentication succeeds.

2. The method according to claim 1, further comprising:
detecting an eye-gaze of the target face using the depth images containing the target face and/or the original 2D images containing the target face;
determining whether a direction of the eye-gaze is consistent with a preset direction; and
in response to that the direction of the eye-gaze is consistent with the preset direction, proceeding to perform one of the steps of the identity authentication.

3. The method according to claim 1, further comprising:
determining whether the target face is a real face using the depth images containing the target face and/or the original 2D images containing the target face; and
in response to determining that the target face is a real face, proceeding to perform one of the steps of the identity authentication.

4. The method according to claim 1, further comprising:
in response to that the similarity value exceeds a second threshold, updating the feature information of the reference face 2D image with the feature information of the target face 2D image.

5. The method according to claim 1, wherein the feature information in the reference face 2D image is obtained by:
obtaining a sequence of depth images containing a reference face and a sequence of original 2D images containing the reference face;
calculating a reference face 3D texture image according to the depth images containing the reference face and the original 2D images containing the reference face;
projecting the reference face 3D texture image to a 2D plane to obtain the reference face 2D image; and
extracting the feature information of the reference face 2D image from the reference face 2D image.

6. The method according to claim 1, wherein
the target face 3D texture image comprises a 3D point cloud with texture information or a 3D mesh with texture information; and
projecting the target face 3D texture image to a 2D plane to obtain the target face 2D image comprises projecting the 3D point cloud or the 3D mesh onto a 2D plane to form the target face 2D image.

7. The method according to claim 1, wherein the target face original 2D images comprise an infrared image or a structured light image.

8. An identity authentication method, comprising:
obtaining a depth image containing a target face and an original two-dimensional (2D) image containing the target face; and
performing identity authentication by performing steps comprising:
obtaining posture information of the target face by registering the depth image containing the target face with a reference face three-dimensional (3D) texture image;
projecting the reference face 3D texture image to a 2D plane to obtain a reference face 2D image according to the posture information of the target face;
comparing the original 2D image containing the target face with the reference face 2D image to determine a similarity value; and
in response to that the similarity value exceeds a first threshold, determining that the identity authentication succeeds.

9. The method according to claim 8, further comprising:
detecting an eye-gaze of the target face using the depth image containing the target face and/or the original 2D image containing the target face;
determining whether a direction of the eye-gaze is consistent with a preset direction; and
in response to that the direction of the eye-gaze is consistent with the preset direction, proceeding to the perform one of the steps of the identity authentication.

10. The method according to claim 8, further comprising:
determining whether the target face is a real face using the depth image containing the target face and/or the original 2D image containing the target face; and
in response to determining that the target face is a real face, proceeding to perform one of the steps of the identity authentication.

11. The method according to claim 8, further comprising:
in response to that the similarity value exceeds a second threshold, updating texture information of the reference face 3D texture image with texture information of a target face 2D image.

12. The method according to claim 8, wherein the reference face 3D texture image is obtained by:
obtaining a sequence of depth images containing a reference face and a sequence of original 2D images containing the reference face; and
calculating the reference face 3D texture image according to the depth images containing the reference face and the original 2D images containing the reference face.

13. The method according to claim 8, wherein
the reference face 3D texture image comprises a 3D point cloud with texture information or a 3D mesh with texture information; and
projecting the reference face 3D texture image to a 2D plane to obtain the reference face 2D image comprises projecting the reference face 3D point cloud or the 3D mesh onto a 2D plane to form the reference face 2D image.

14. The method according to claim 8, wherein the target face posture information is consistent with reference face posture information of the reference face 2D image.

15. A identity authentication method, comprising:
obtaining a depth image containing a target face and an original two-dimensional (2D) image containing the target face; and
performing identity authentication by performing steps comprising:
  obtaining posture information of the target face by registering the depth image containing the target face with a reference face three-dimensional (3D) texture image;
  obtaining a target face 2D image by aligning the original 2D image containing the target face with the posture information of the target face;
  extracting feature information from the target face 2D image;
  comparing the feature information of the target face 2D image with feature information of a reference face 2D image to determine a similarity value; and
  in response to that the similarity value exceeds a first threshold, determining that the identity authentication succeeds.

16. The method according to claim 15, further comprising:
detecting an eye-gaze of the target face using the depth image containing the target face and/or the original 2D image containing the target face;
determining whether a direction of the eye-gaze is consistent with a preset direction; and
in response to that the direction of the eye-gaze is consistent with the preset direction, proceeding to perform one of the steps of the identity authentication.

17. The method according to claim 15, further comprising:
determining whether the target face is a real face using the depth image containing the target face and/or the original 2D image containing the target face; and
in response to determining that the target face is a real face, proceeding to perform one of the steps of the identity authentication.

18. The method according to claim 15, further comprising:
in response to that the similarity value exceeds a second threshold, updating the feature information of the reference face 2D image with the feature information of the target face 2D image.

19. The method according to claim 15,
wherein the reference face 3D texture image is obtained by:
  obtaining a sequence of depth images containing a reference face and a sequence of original 2D images containing the reference face; and
  calculating the reference face 3D texture image according to the depth images containing the reference face and the original 2D images containing the reference face, and
wherein the feature information of the reference face 2D image is obtained by:
  projecting the reference face 3D texture image to a 2D plane to obtain the reference face 2D image; and
  extracting the feature information of the reference face 2D image from the reference face 2D image.

20. The method according to claim 15, wherein
the reference face 3D texture image comprises a 3D point cloud with texture information or a 3D mesh with texture information; and
projecting the reference face 3D texture image to a 2D plane to obtain the reference face 2D image comprises projecting the 3D point cloud or the 3D mesh onto a 2D plane to form the reference face 2D image.

* * * * *